United States Patent [19]

Atobe et al.

[11] Patent Number: 4,525,676
[45] Date of Patent: Jun. 25, 1985

[54] PSK DEMODULATION SYSTEM HAVING CARRIER FREQUENCY VARIATION COMPENSATION

[75] Inventors: Masaaki Atobe; Yoshimi Tagashira, both of Tokyo, Japan

[73] Assignee: Nippon Electric Co., Ltd., Tokyo, Japan

[21] Appl. No.: 351,258

[22] Filed: Feb. 22, 1982

[30] Foreign Application Priority Data

Feb. 24, 1981 [JP] Japan .................................. 55-25709
Feb. 24, 1981 [JP] Japan .................................. 55-25710

[51] Int. Cl.³ ............................................. H03D 3/02
[52] U.S. Cl. ..................................... 329/50; 329/110; 329/122; 329/124; 329/136; 375/83; 375/120
[58] Field of Search ................. 329/50, 110, 122, 124, 329/136; 375/83, 84, 85, 86, 87, 94, 96, 110, 120, 52, 53, 54, 55, 56, 57

[56] References Cited

U.S. PATENT DOCUMENTS 4,308,503 12/1981 Scott ...................................... 329/50
4,339,725 7/1982 Ichiyoshi ........................... 375/83 X
4,339,823 7/1982 Predina et al. ................... 329/122 X
4,361,894 11/1982 Kurihara et al. ................. 375/86 X
4,409,562 10/1983 Kurihara .......................... 329/122 X
4,461,014 7/1984 Fujino .............................. 329/110 X

FOREIGN PATENT DOCUMENTS 52-3543 1/1977 Japan .
52-3544 1/1977 Japan .
149554 11/1980 Japan ..................................... 375/52
2770 1/1981 Japan ..................................... 375/94
56-41010 9/1981 Japan .

Primary Examiner—Eugene R. LaRoche
Assistant Examiner—D. C. Mis

[57] ABSTRACT

A system for demodulation of phase shift keying signals with a bandpass filter tracked to input carrier frequency variation. This system provides means for detecting phase variations in the regenerated carrier wave from the demodulated signal, and means for controlling the phase of the regenerated carrier wave to compensate for the demodulation error owing to input carrier frequency variation.

3 Claims, 6 Drawing Figures

PSK DEMODULATION SYSTEM HAVING CARRIER FREQUENCY VARIATION COMPENSATION

BACKGROUND OF THE INVENTION

This invention relates to a system for demodulation of phase shift keying signals (hereafter referred to as PSK signals) used in data transmission systems. More particularly, this invention contemplates, in a system which extracts reference carrier wave and improves the signal-to-noise ratio of the reference carrier wave by use of a bandpass filter, a circuit for automatically compensating for the degradation of demodulation characteristics due to variations in the input frequency to the system by eliminating modulated components of PSK signals by means of a remodulator or by eliminating the modulated components by means of an N-frequency multiplier (in the case of N-phase PSK).

In the PSK communication, the data is transmitted in the form of relative phase changes of the carrier wave. Demodulation of such PSK signals is effected by comparing the phase of the PSK signal and that of the reference carrier wave. In the demodulation of PSK signals, therefore, the receiver is required to regenerate the reference carrier wave from the received signal. In one known method available for the extraction of the reference carrier wave from the PSK signal, the PSK signal is converted into a continuous signal by use of a remodulator or an N-frequency multiplier (in the case of N-phase PSK modulated signal) to thereby eliminate modulated components and further phase jitters are reduced by means of a bandpass filter. This method operates with a relatively simple configuration and proves excellent in the sense that the reference carrier wave suffers little from jitters. Nevertheless, it is deficient in that it is vulnerable to changes in the input frequency. To be specific, since the bandpass filter has its central frequency fixed, a possible change in the input frequency will cause a phase modulation in the regenerated carrier wave, with the result that the demodulated output of the PSK signal is attenuated.

One conventional system (described in "The Design of a PSK MODEM for Telesat. TDMA System", S. Yokoyama et al, ICC 75, June 16–18, San Francisco) known to improve the situation detects variations in the input frequency during the regeneration of the reference carrier wave and compensates for the phase of the regenerated carrier wave by use of the detected signal. Generally, however, it is not easy to effect perfect detection of variations in the input frequency. Particularly where the input frequency is high, a possible delay in the pass time of the remodulator or the N-frequency multiplier and a possible delay in the pass time of the bandpass filter may cause an erroneous detection.

SUMMARY OF THE INVENTION

This invention contemplates an improvement in a circuit which takes advantage of the regeneration of the carrier wave being passed through a bandpass filter and has for its object to provide a simplified PSK signal demodulation circuit which suffers little from jitters of the reference carrier wave and assures stable communication despite variations in the input frequency.

The system in accordance with this invention is constructed so that the automatic compensation of phase is accomplished by detecting variations in the phase of the carrier wave on the basis of the output of the demodulation circuit and in lieu thereof controlling the phase of the carrier wave being passed through the bandpass filter.

Specifically, according to this invention, in a system for the demodulation of PSK signals having a bandpass filter adapted to pass a regenerated carrier wave therethrough for reduction of phase jitters of the regenerated carrier wave, the system being characterized by means for detecting phase variations in the regenerated carrier wave from the modulated signal and means for controlling the phase of the carrier wave being passed through the bandpass filter on the basis of the detection output of the detecting means.

BRIEF DESCRIPTION OF THE DRAWING

In the figures, like reference numerals represent like components.

DESCRIPTION OF PREFERRED EMBODIMENTS

Figure 1:
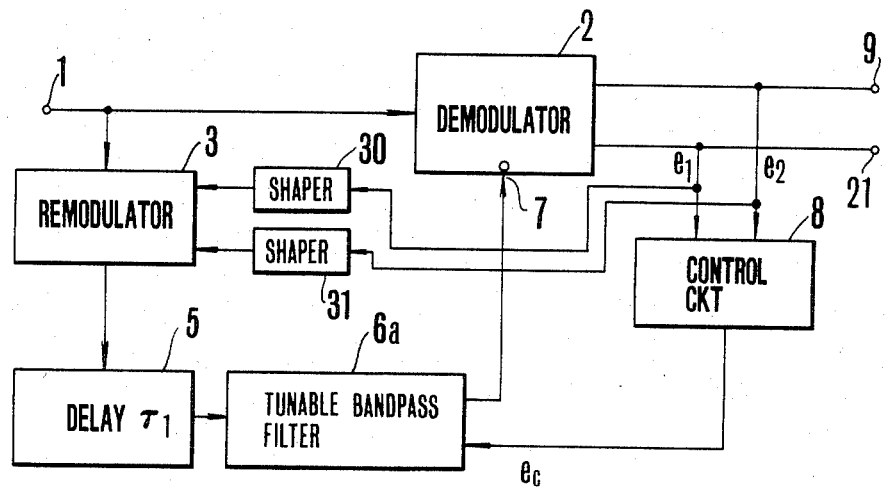
FIG. 1 is a block diagram illustrating the essential part of a first embodiment of this invention namely a tunable bandpass filter wherein the passing phase varies as the central frequency is varied.

Now, embodiments of the present invention will be described below with reference to the accompanying drawings. FIG. 1 is a block diagram illustrating the essential part of a first embodiment of the invention. To an input terminal 1 for PSK signals are connected a PSK signal demodulator 2 and a remodulator 3. To the remodulator 3 is connected a delay line or circuit 5 having a delay time $\tau_1$. To this delay circuit 5 is connected a tunable bandpass filter 6a comprised of, for example, a varactor diode. In this arrangement, the delay circuit 5 is not formed by insertion of any specific delay circuit but is representative of an accumulation of delay times over an amplifier, a limiter circuit, and the tunable bandpass filter 6a and/or accruing from other causes.

From the tunable bandpass filter 6a, the carrier wave input signal for demodulation is led to an input terminal 7 of the PSK signal demodulator 2. To a control circuit 8 which characterizes the present invention, a horizontal component $e_1$ and a vertical component $e_2$, i.e., the orthogonal components into which the demodulation output of the PSK signal demodulator 2 has been divided, are led. A control signal $e_c$ of the control circuit 8 is led to the tunable bandpass filter 6a. In FIG. 1, 9 and 21 denote output terminals for demodulated signals.

The orthogonal components $e_1$ and $e_2$ are also fed to the remodulator 3 via waveform shapers 30 and 31 to drive the remodulator 3.

Now, the operation of the demodulation circuit constructed as described above will be described. The signal obtained from the remodulation of the PSK input signal in the remodulator 3 is passed through the tunable bandpass filter 6a to produce a carrier wave necessary for demodulation in the same way as with the conventional system. In this case, the output of the control circuit 8 causes the central frequency of the tunable bandpass filter 6a to follow the variations in the frequency on the transmitter side.

Let $\omega_0$ stand for an angular frequency of carrier wave of the input signal and $\Delta\omega$ for its variation, then the phase at the terminal 7 will be expressed as follows:

$$\theta + \Delta\theta = (\omega_0 + \Delta\omega)\tau_1, \quad \theta = \omega_0\tau_1 \qquad (1)$$

Since $\omega_0$ is a fixed frequency, the phase of the regenerated carrier wave can be adjusted to a desired level by finely adjusting the delay time $\tau_1$ of $\theta$ (normally, a variable phase shifter is incorporated for this adjustment in the circuit). The varying phase component attributable to $\Delta\theta$, namely, $$\Delta\theta = \Delta\omega\tau_1$$

represents a phase error which leads to degradation of the demodulation characteristics. Therefore, the phase component is desired to be reduced to 0. For this purpose, the present invention detects this phase component $\Delta\theta$ with the control circuit 8, generates a control signal proportional to $\Delta\theta$, reverses the polarity of the control signal, feeds the resultant control signal to the tunable bandpass filter 6a, and controls the central frequency of the filter 6a so that the central frequency will follow the variations in the frequency on the transmitter side. The fact that as the control signal proportional to $\Delta\theta$ is amplified, so the $\Delta\theta$ is compressed and the fact that a low-pass filter is required to be incorporated in the feedback circuit are similar to those which are involved in the ordinary configuration of any phase locked loop.

These facts will be described more fully below.

Figure 2:
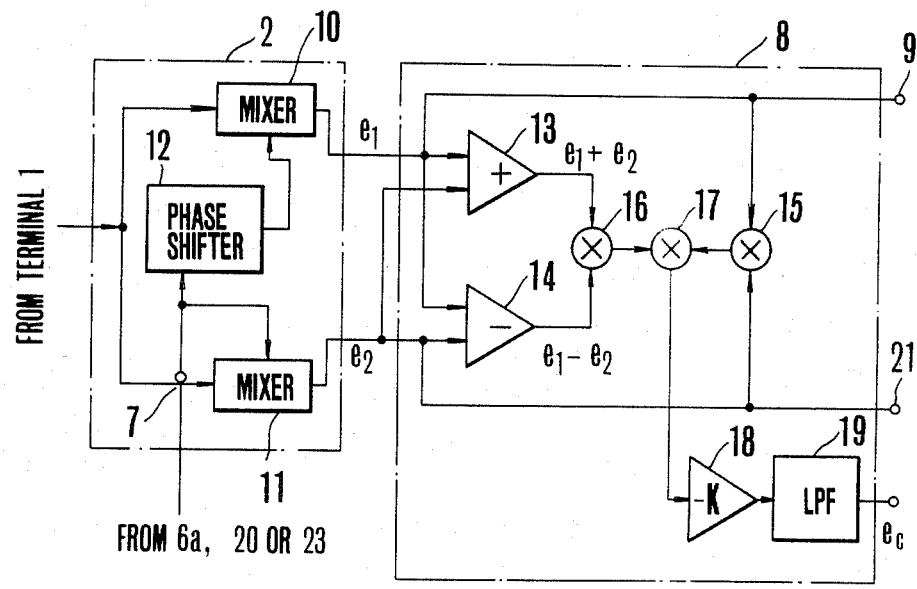
FIG. 2 is a block diagram of a control circuit in FIG. 1.

FIG. 2 is a block diagram illlustrating an example of the control circuit 8 in detail. This example uses a 4-phase PSK signal. The configuration of FIG. 2 generally has a PSK signal demodulator 2 and a control circuit 8.

To the input terminal for the PSK signal are connected mixers 10 and 11. To the other terminal of the mixer 10, the output of a $\pi/2$ phase shifter 12 is fed. To the other input terminal of the mixer 11, the output of the tunable bandpass filter 6a is fed via the terminal 7. The outputs from the mixers 10 and 11 are fed respectively to an adder 13 and a subtractor 14. Further, the outputs from the mixers 10 and 11 are led to a multiplier 15. The outputs from the adder 13 and subtractor 14 are led to a multiplier 16. The outputs from the multipliers 15 and 16 are led to a multiplier 17. The output from this multiplier 17 is led to an inverted amplifier 18 having a gain $-K$. The output from the inverted amplifier 18 is led to a low-pass filter 19. The resultant output serves as the control signal $e_c$ for the tunable bandpass filter 6a illustrated in FIG. 1 or a voltage-controlled oscillator to be described later.

Figure 3:
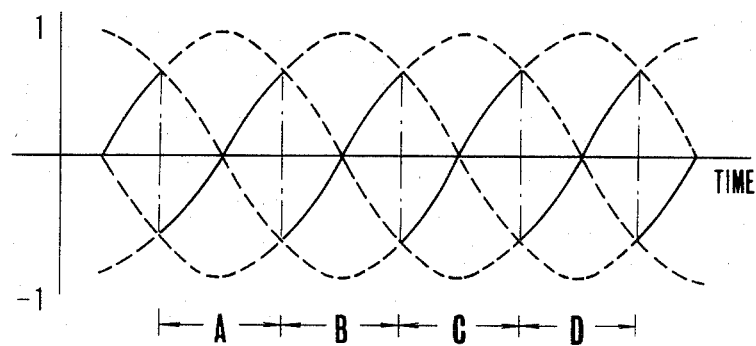
FIG. 3 is a diagram showing waveforms of 4-phase modulation.

FIG. 3 represents a diagram showing 4-phase modulated waveforms. When the baseband processing is effected on the receiver side, one of the four phases indicated by the broken line is locked and the phase is drawn at the point at which the curves of solid line rising upwardly to the right intersect the zero level. The phase drawing is effected in the ranges, respectively indicated by A, B, C, and D.

In the configuration described above, the PSK signal is fed from the input terminal 1 to the PSK signal demodulator 2. By the mixers 10 and 11, the signal is divided into orthogonal components, i.e., a horizontal component $e_1$ and a vertical component $e_2$ expressed as below:

$$e_1 = \sin(\Delta\theta + a_i\pi/4)$$
$$e_2 = \cos(\Delta\theta + a_i\pi/4)$$

where $\Delta\theta$ denotes the phase error of the carrier wave and $a_1$ denotes the modulated phase sign which freely assumes a value of $\pm 1$ or $\pm 3$.

The orthogonal components $e_1$ and $e_2$ are added to each other in the adder 13 and subtracted from each other in the subtractor 14. Subsequently, they are multiplied by each other in the multiplier 16. From the multiplier 16, therefore, the following output is obtained.

$$A = (e_1 + e_2) \times (e_1 - e_2).$$

From the multiplier 15, the following product is obtained as an output.

$$B = e_1 \times e_2.$$

These outputs, A and B, are multiplied by each other in the multiplier 17. The output from this multiplier 17 is as shown below.

$$C = A \times B$$
$$= (\sin 2\Delta\theta \sin a_i\pi/2) \times 1/2\{\sin(2\Delta\theta + a_i\pi/2)\}$$

Since $a_i = \pm 1$ or $\pm 3$, the following expression is obtained.

$$C = 1/2 \sin 2\Delta\theta \times \cos 2\Delta\theta$$
$$\approx 1/4 \sin 4\Delta\theta$$

The control signal $e_c$, therefore, is expressed as $$e_c = -K \times \tfrac{1}{4} \sin 4\Delta\theta.$$

Since the value of $\Delta\theta$ is extremely small, the following expression is derived.

$$e_c = -K \times 1/4 \sin 4\Delta\theta$$
$$= -K\Delta\theta.$$

Thus, the control signal $e_c$ becomes a signal which has a polarity opposite to the polarity of the phase error and a magnitude proportional to that of the phase error. Controlled by this control signal $e_c$ is the central frequency of the tunable bandpass filter 6a illustrated in FIG. 1 or the frequency of a voltage-controlled oscillator to be described later, so that the central frequency of the tunable bandpass filter 6a is made to follow the variations in the frequency on the transmitter side.

This example has been described in terms of the 4-phase PSK signal. In case where the received signal is a multi-value modulated signal (such as, for example, 16 AM and 8 PSK), the extraction of the phase error signal can be effected by converting the demodulated signal into horizontal and vertical components equivalent to those of the 4 PSK signal. This rule similarly applies to the system using 2 PSK signal.

Figure 4:
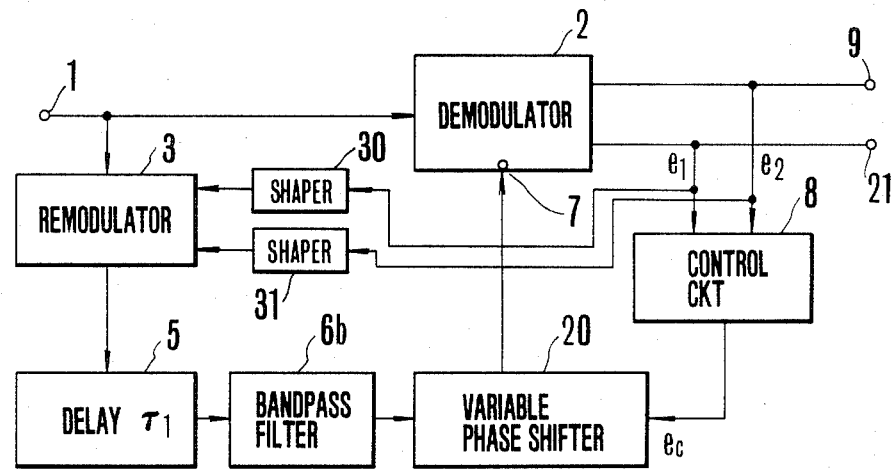
FIG. 4 is a block diagram illustrating the essential part of a second embodiment of this invention which produces the same effect as the first embodiment but wherein the bandpass filter and variable phase shifter are separated.

FIG. 4 is a block diagram illustrating the essential part of a second embodiment of this invention. Compared with the previous embodiment, the second embodiment is characterized by additionally comprising a variable phase shifter 20 comprised of, for example, a varactor diode, whereby the control signals $e_c$ from the control circuit 8 is applied to the shifter 20. A possible variation in the frequency of the input carrier wave will cause a deviation of phase in the regenerated carrier wave which has passed through a bandpass filter 6b (not tunable). This phase deviation is compensated for by causing the control signal $e_c$ from the control circuit 8 to control the variable phase shifter 20.

Figure 5:
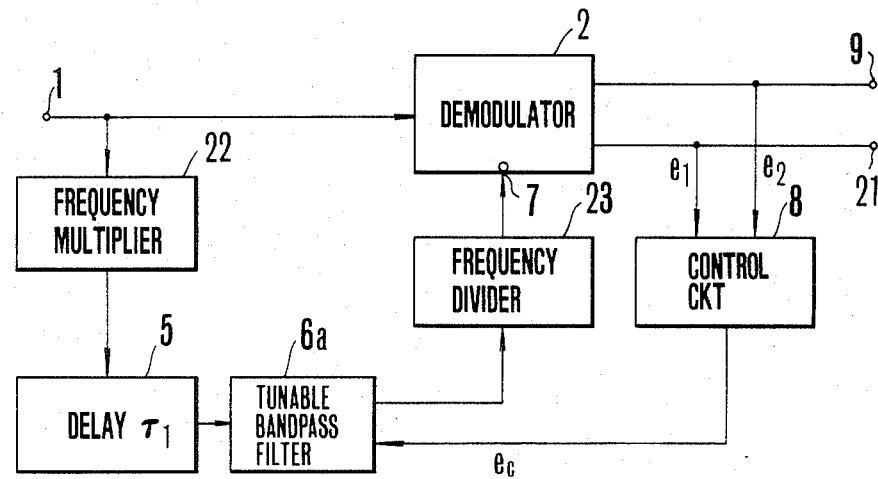
FIG. 5 is a block diagram illustrating the essential part of a third embodiment of the present invention wherein a frequency multiplier is used to eliminate the modulated component from an input PSK signal.

FIG. 5 is a block diagram illustrating the essential part of a third embodiment of this invention. As compared with the first embodiment, the third embodiment is characterized by effecting the elimination of modulated component by use of a frequency multiplier. In FIG. 5, 22 denotes an N-frequency multiplier and 23 a 1/N-frequency divider.

To be specific, the N-frequency multiplier 22 serves to eliminate phase modulated components and the 1/N-frequency divider serves to restore, through multiplication by 1/N, the frequency of the regenerated carrier wave which has passed through the tunable bandpass filter 6a for elimination of phase jitters and amplitude jitters into the frequency of the input signal carrier wave.

Figure 6:
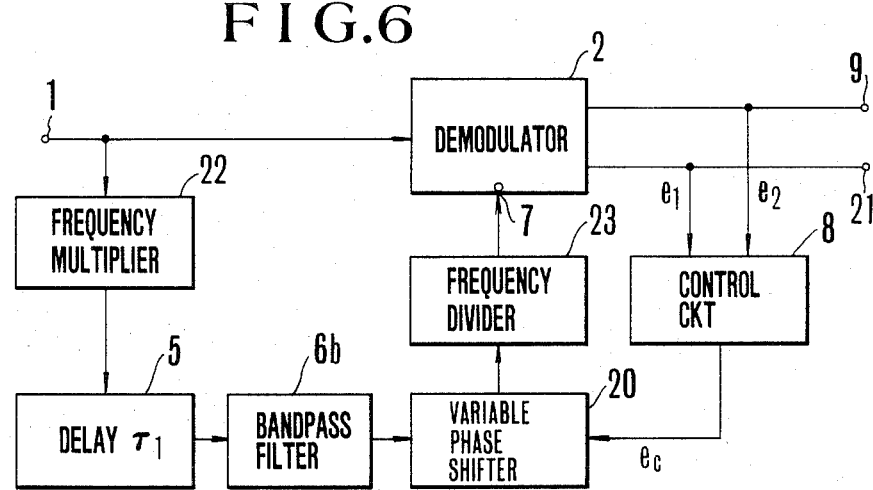
FIG. 6 is a block diagram illustrating the essential part of a fourth embodiment of the present invention which produces the same effect as the third embodiment but wherein the bandpass filter and variable phase shifter are separated.
Figure 7:
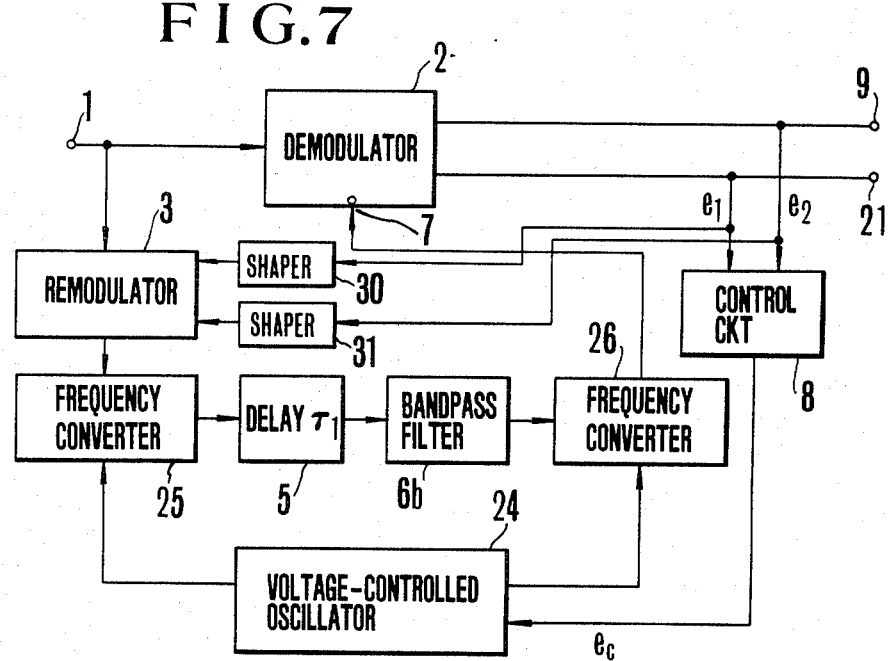
Figure 8:
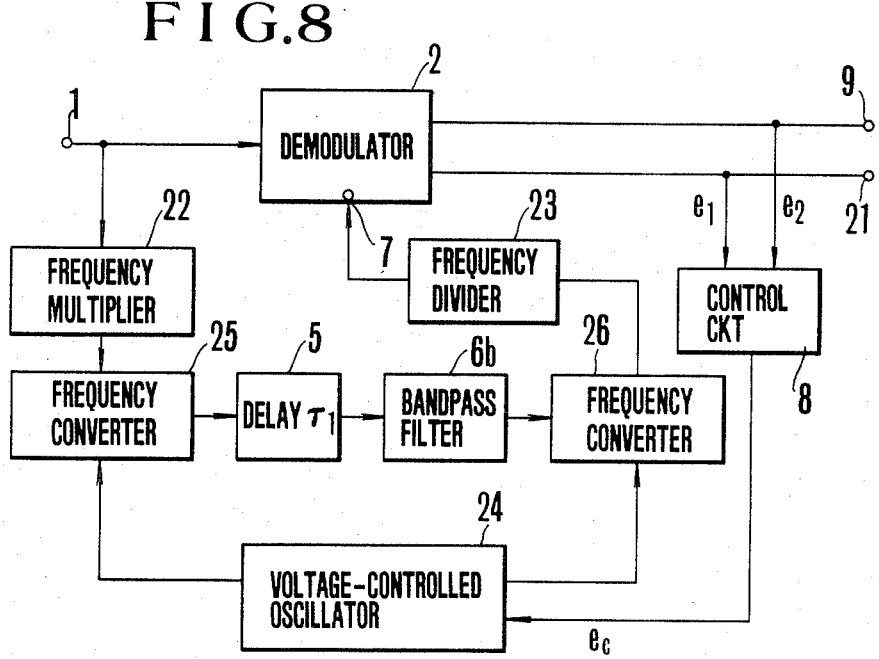

FIG. 6 is a block diagram illustrating the essential part of a fourth embodiment of the invention. This embodiment similarly effects the elimination of modulated components by means of a multiplier. It represents the use of the frequency multiplier in the configuration of the third embodiment.

In FIG. 6, 24 denotes an N-frequency multiplier and 25 a 1/N-frequency divider.

To be specific, the N-frequency multiplier 24 serves to eliminate phase modulated components and the 1/N-frequency divider 25 serves to restore, through multiplication by 1/N, the frequency of the regenerated carrier wave which has passed through the bandpass filter 6b for elimination of phase jitters and amplitude jitters into the frequency of the input signal carrier wave.

As described above, the present invention assures the detection of variations in the carrier wave phase by use of the output of demodulated carrier wave and controls the central frequency of the tunable bandpass filter on the basis of the detected variation so that the central frequency will follow the variation of the frequency on the transmitter side, or converts the frequency of the bandpass filter output so that the frequency of the regenerated carrier wave will follow the variation of the frequency on the transmitter side.

The system of the present invention, therefore, permits stable communication to be continued despite variations in the input frequency. Moreover, it can be used with the conventional system without requiring any modification thereto. Consequently, the relatively simple construction and the ample freedom from jitters of the reference carrier waves which constitute the merits for the carrier wave regeneration circuit incorporating a remodulator or an N-frequency multiplier (in the case of N-phase modulated signals) and a bandpass filter are retained intact by the system of this invention.

What is claimed is:
1. A system for demodulation of phase shift keying signals comprising:
   means, including a bandpass filter having an input and an output, which receives the phase shift keying signal for regenerating a carrier wave, said carrier wave passing through said bandpass filter;
   demodulator means having an input and output for demodulating the phase shift keying signal in response to the regenerated carrier wave which is input from said carrier wave regenerating means to thereby produce a demodulated signal;
   means for detecting phase variations in said regenerated carrier wave with respect to said demodulated signal; and
   phase control means responsive to the output of the phase variation detecting means to correct the phase of said carrier wave passing through said bandpass filter by controlling the phase of said carrier wave at the output of said band pass filter.
2. A demodulation system according to claim 1 wherein said phase control means comprises a phase shifter responsive to the output of said phase variation detecting means.
3. A demodulation system according to claim 1 wherein said carrier wave regenerating means further comprises a remodulator connected to the output of said demodulator means and connected to the input of said bandpass filter and which receives the phase shift keying signal.

* * * * *

UNITED STATES PATENT AND TRADEMARK OFFICE
CERTIFICATE OF CORRECTION

PATENT NO. : 4,525,676

DATED : June 25, 1985

INVENTOR(S) : Atobe et al.

It is certified that error appears in the above-identified patent and that said Letters Patent is hereby corrected as shown below:

| COLUMN | LINE | DESCRIPTION |
|---|---|---|
| 2 | 1 | Please delete "in lieu thereof" and insert --by--. |

Signed and Sealed this

Eighth Day of March, 1988

*Attest:*

DONALD J. QUIGG

*Attesting Officer*     *Commissioner of Patents and Trademarks*